United States Patent
Bae

(10) Patent No.: US 7,610,043 B2
(45) Date of Patent: Oct. 27, 2009

(54) DUPLICATE NOTIFICATION MESSAGE PROCESSING METHOD IN TERMINAL

(75) Inventor: Bum-Suk Bae, Busan (KR)

(73) Assignee: LG Electronics, Inc., Seoul (KR)

( * ) Notice: Subject to any disclaimer, the term of this patent is extended or adjusted under 35 U.S.C. 154(b) by 212 days.

(21) Appl. No.: 11/556,111

(22) Filed: Nov. 2, 2006

(65) Prior Publication Data

US 2007/0100951 A1    May 3, 2007

(30) Foreign Application Priority Data

Nov. 2, 2005    (KR) ...................... 10-2005-0104595

(51) Int. Cl.
*H04M 1/725* (2006.01)
*H04W 4/00* (2009.01)
(52) U.S. Cl. .................. 455/412.2; 455/412.1; 455/466
(58) Field of Classification Search ... 455/414.1–414.3, 455/412.1, 466, 517; 709/231, 206, 207
See application file for complete search history.

(56) References Cited

U.S. PATENT DOCUMENTS

| | | | | |
|---|---|---|---|---|
| 4,872,005 | A * | 10/1989 | DeLuca et al. | 340/7.41 |
| 5,163,082 | A * | 11/1992 | Karnowski | 379/88.1 |
| 6,654,786 | B1 * | 11/2003 | Fox et al. | 709/203 |
| 6,745,193 | B1 | 6/2004 | Horvitz et al. | |
| 7,171,222 | B2 * | 1/2007 | Fostick | 455/466 |
| 2002/0078228 | A1 | 6/2002 | Kuisma et al. | |
| 2002/0156854 | A1 | 10/2002 | Matsumoto | |
| 2004/0125925 | A1 * | 7/2004 | Marsot | 379/88.22 |
| 2005/0165897 | A1 * | 7/2005 | Prenzel et al. | 709/207 |
| 2006/0166651 | A1 * | 7/2006 | Kim | 455/412.1 |
| 2007/0086395 | A1 * | 4/2007 | Bakshi et al. | 370/338 |
| 2007/0124383 | A1 * | 5/2007 | Hebert et al. | 709/206 |
| 2007/0261076 | A1 * | 11/2007 | Puputti | 725/25 |
| 2008/0158337 | A1 * | 7/2008 | Richardson | 348/14.09 |

FOREIGN PATENT DOCUMENTS

JP    2004118393 A  *  4/2004
WO    WO 03/079637 A    9/2003

* cited by examiner

*Primary Examiner*—Nick Corsaro
*Assistant Examiner*—Munsoon Choo
(74) *Attorney, Agent, or Firm*—Lee, Hong, Degerman, Kang & Waimey

(57) ABSTRACT

A duplicate notification message processing method in a terminal is disclosed. The method includes receiving a notification message indicating the reception of a multimedia message from an MMS server; deleting the notification message when the notification message is a duplicate notification message and a multimedia message corresponding to the notification message has been downloaded, and transmitting either a response message for the notification message or a request message for a multimedia message when the notification message is not a duplicate notification message.

20 Claims, 9 Drawing Sheets

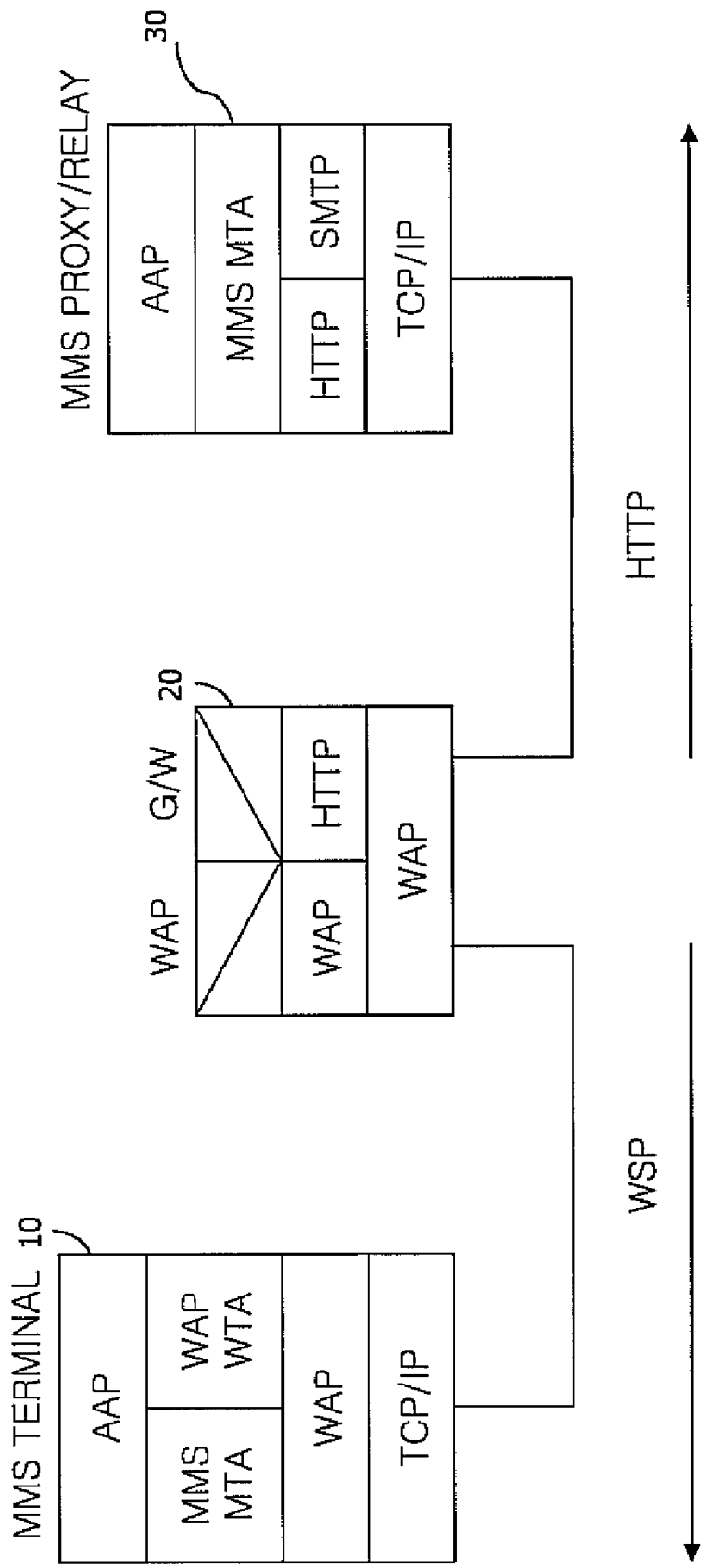

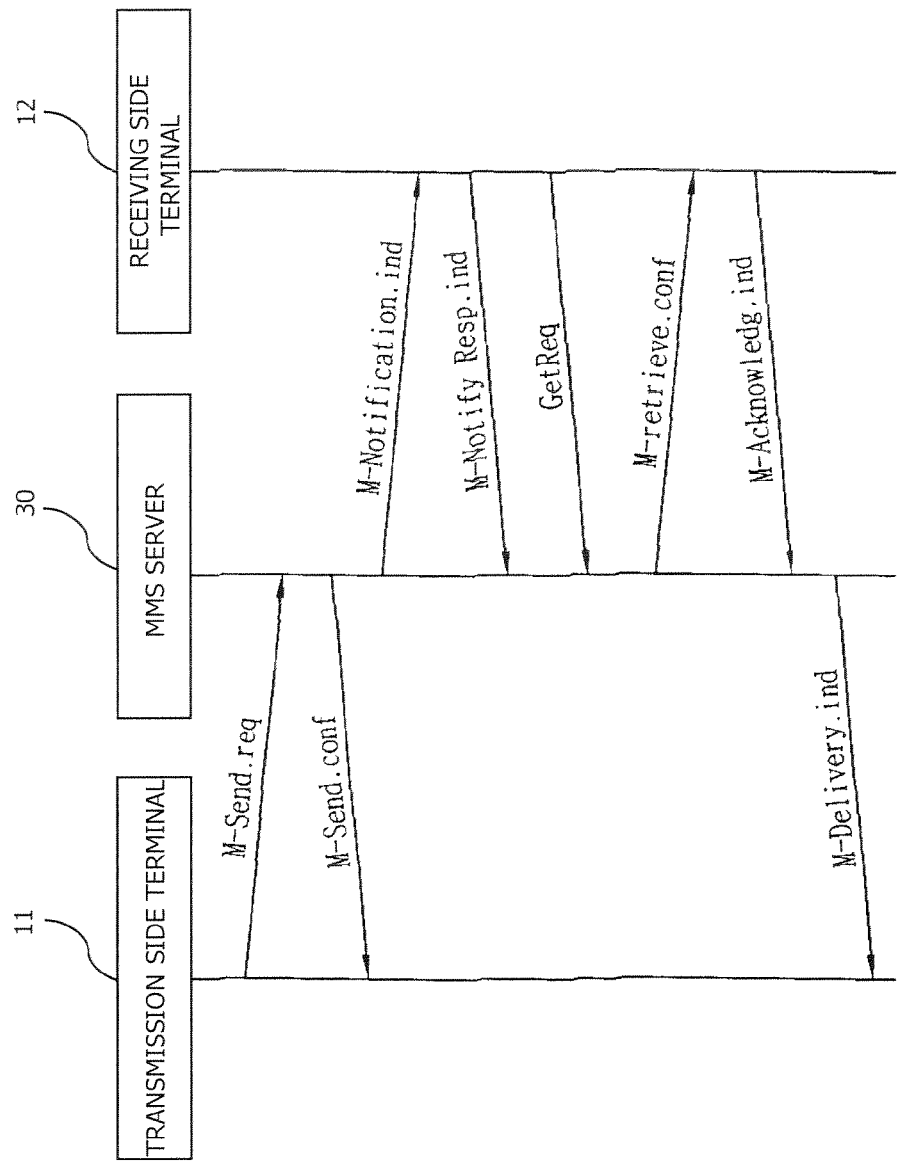

DUPLICATE NOTIFICATION MESSAGE PROCESSING METHOD IN TERMINAL

CROSS-REFERENCE TO RELATED APPLICATIONS

Pursuant to 35 U.S.C. § 119(a), this application claims the benefit of earlier filing date and right of priority to Korean Application No. 104595/2005, filed on Nov. 2, 2005, the contents of which is hereby incorporated by reference herein in its entirety.

FIELD OF THE INVENTION

The present invention relates to a duplicate notification message processing method in a terminal, and more particularly, to a duplicate notification message processing method in a terminal, that supports a multimedia messaging service (MMS).

DESCRIPTION OF THE RELATED ART

Presently, established WAP (wireless application protocol) 1.x standards are used in the wireless terminal market for wireless data services that can provide IP processing and Internet service in a terminal without restriction. The WAP method mainly provides a plain text menu-based service optimized for low-bandwidth, low-specification terminals. Also, a SMS (short message service) used in GSM or IS-41 performs a message transfer service of a short message of approximately 100 bytes in text format.

The provision of the text-based service enables an MMS that allows users to receive diverse, high-quality multimedia. The system includes an MMS proxy/relay server for IP network connection and multimedia message processing and a server storing and managing messages. The MMS proxy/relay server uses a SMTP (simple message transfer protocol) and a HTTP (hyper text transfer protocol) for connection to a mail service and a WAP service, respectively, which are currently performed over an IP network. Further, the SMTP protocol is used for connection to other MMS proxy/relay servers.

FIG. 1 illustrates a conventional MMS protocol stack. As illustrated in FIG. 1, an MMS terminal 10 uses a WSP (wireless session protocol) and a HTTP protocol for connection to an MMS proxy/relay server (hereinafter, referred to as an MMS server) 30 via a WAP gateway 20.

The MMS server 30 uses a SMTP protocol, which is currently widely known as a mail protocol, for connection to other MMS servers. The procedure of the MMS service will be explained below.

First, a transmission side terminal receives an attached mail message of a multimedia file that is sent by a message sender through an Internet network by using the SMTP protocol. The transmission side terminal parses mail with reference to the corresponding mail recipient profile and converts media, such as text and image, in order to optimize the media for a receiving side terminal. The profile information contains information related to use of the receiving side terminal, such as availability of MMS support, resolution, number of supported colors, memory capacity, and so forth.

Subsequently, the MMS server 30 notifies the terminal of message arrival. The MMS server may send a notification message (M-notification.ind) to the receiving side terminal via a by connection to a WAP G/W (gateway) using the HTTP protocol, or notify the receiving side terminal of arrival in a text message format, via a connection to existing SMSCs (short message service centers).

The notification message contains URI (uniform resource indicator) information containing a multimedia message. A reserved transfer method that can transmit a message at a time desired by a sender by using a scheduling technique may be used for notification management.

After receiving the notification message, the receiving side terminal sends a message (M-Notify resp.ind) in response to the notification message and is able to receive, reject, or delete the corresponding message. When the receiving side terminal receives a message, it accesses the MMS server using the URI of the corresponding message according to a HTTP GET method.

Subsequently, the MMS server encapsulates a converted message and transmits the encapsulated message to the receiving side terminal during a WSP session. Alternately, the MMS server is able to convert a multimedia message (M-send.req) created by the transmission side terminal into a mail format or MMS message and thereafter transmit the converted multimedia message to the Internet or an MMS support terminal.

The above-described procedure is illustrated in FIG. 2. FIG. 2 illustrates a conventional MMS transaction flow.

When a transmission side terminal 11 desiring to send a multimedia message sends a M-Send.req message to the MMS server 30, the MMS server 30 sends the corresponding response message M-Send.conf to the transmission side terminal at the same time the MMS server 30 sends a notification message M-Notification indicating arrival of the multimedia message to the receiving side terminal 12. The receiving side terminal 12 sends a M-Notyfyresp.ind message to the MMS server 30 in response to the notification message M-Notification or receives an actual multimedia message M-retrieve.conf through a GetReq request.

If the receiving side terminal 12 receives the multimedia message M-retrieve.conf, it sends the corresponding response message M-Acknowledge.ind to the MMS server 30. Afterwards, if the receiving side terminal 30 requests information related to whether the MMS server 30 has transmitted the corresponding message to the receiving side terminal 12, the MMS server 30 sends an acknowledgment message M-Delivery.ind to the receiving side terminal 11.

Presently, an MMS server of version MMSC V1.0 is utilized in order to support the multimedia service. The MMS server 30 of version MMSC V1.0 uses only SMS push in order to send a notification message indicating arrival of a multimedia message to the receiving side terminal 12. However, the MMS server 30 of version MMSC V1.0 does not check whether the notification message has actually been transmitted to the receiving side terminal 12 since there is a low probability of not transmitting the notification message to the receiving side terminal.

Accordingly, the MMS server 30 of version MMSC V1.0 does not transmit a notification message again even if the notification message it transmitted does not arrive at the receiving side terminal 12, thereby causing a low reliability of message arrival. Therefore, there is an increasing trend to change the version of a MMS server from MMSC V1.0 to MMSC V1.X in order to increase the reliability of message arrival.

Version MMSC V1.X uses a retry mechanism. The retry mechanism includes sending a notification message to the receiving side terminal 12 every retry period until receipt of the notification message is acknowledged by the receiving side terminal. The MMS server stops transmitting a notification message M-notification when the MMS server receives a HTTP GET request having the same URI as the notification message or a notification message response having the same transaction ID as the notification message.

FIG. 3 illustrates the difference between the MMS server 31 of version MMSC V1.0 and the MMS server 32 of version MMSC V1.X. FIG. 3A illustrates communication between the MMS server 31 of MMSC V1.0 and the receiving side terminal 12. FIG. 3B illustrates communication between the MMS server 32 of version NMSC V1.X version and the receiving side terminal 12.

As illustrated in FIG. 3A, the server 31 sends a notification message M-Notification.ind to the receiving side terminal 12 by using SMS push. Since the MMS server 31 of version MMSC V1.0 and does not use the retry mechanism, it only sends the notification message but does determine whether the receiving side terminal 12 actually received the notification message.

As illustrated in FIG. 3B, the server 32 of version MMSC V1.X version sends a notification message M-Notification.ind to the receiving side terminal 12 using the retry mechanism. Therefore, the MMS server 32 sends Notification.ind to the receiving side terminal 12 at a predetermined retry period until it receives a NotifyResp.ind message from the receiving side terminal in response to sending the notification message M-Notification.ind.

Accordingly, if version MMSC V1.X is applied to the MMS server 32, the receiving side terminal 12 can receive the notification message from the MMS server without failure. However, if a duplicate notification message is received before a multimedia message is downloaded and the response message sent by the receiving side terminal 12 is lost, the receiving side terminal does not send a response message for the duplicate notification message and, therefore, receives consecutive notification messages. Because of this, the receiving side terminal 12 receives a lot of junk messages.

Furthermore, if a duplicate notification message is received after a multimedia message is downloaded, the receiving side terminal 12 acknowledges the duplicate notification message as a new notification message since the existing notification message is already deleted. Therefore, a user may make duplicate payments for the same multimedia message.

Moreover, the receiving side terminal 12 repeats the procedure of receiving and deleting a notification message when it receives consecutive duplicate notification messages. This repeated procedure shortens the life span of its battery.

SUMMARY OF THE INVENTION

One object of the present invention is to provide a message processing method that can prevent a receiving side terminal from consecutively receiving a message requesting a response or acknowledgement in a data transmission system that transmits data sent by a transmission side terminal to a receiving side terminal only when there is a response or acknowledgment from the receiving side terminal. Another object of the present invention is to provide a duplicate notification message processing method in a terminal that can process an unnecessary duplicate notification message in a multimedia message service provision system utilizing a retry mechanism.

In another aspect of the present invention, a message processing method in a terminal supporting a multimedia messaging service (MMS) is provided. The method includes receiving a notification message indicating reception of a multimedia message from an MMS server, determining if the notification message is a duplicate notification message, deleting the notification message if it is determined that the notification message is a duplicate notification message and a multimedia message corresponding to the notification message has been downloaded and transmitting one of a response message corresponding the notification message and a request message requesting a multimedia message if it is determined that the notification message is not a duplicate notification message.

It is contemplated that the method further includes transmitting one of a response message corresponding to the notification message and a message requesting a multimedia message if it is determined that the notification message is a duplicate notification message. It is further contemplated that the method further includes changing a reception time of the notification message if it is determined that the notification message is a duplicate notification message and no multimedia message corresponding to the duplicate notification message has been downloaded.

It is contemplated that the method further includes storing the notification message if it is determined that the notification message is not a duplicate notification message. It is further contemplated that the method further includes setting a maximum time for a message to arrive as a maximum storage time and deleting at least one stored notification message that has been stored for greater than the maximum storage time.

It is contemplated that deleting the at least one stored notification message is performed during an idle mode. It is further contemplated that deleting the at least one stored notification message is performed when initializing the terminal.

It is contemplated that the method further includes setting a maximum time for a message to arrive as a maximum storage time and storing the notification message for a period of time according to the maximum storage time if it is determined that the notification message is not a duplicate notification message. It is further contemplated that determining if the notification message is a duplicate notification message includes determining if a transaction identifier (TID) of the notification message is the same as a transaction identifier of a stored notification message.

In another aspect of the present invention, a method for providing a multimedia messaging service (MMS) is provided. The method includes an MMS server transmitting a first notification message to a terminal, the first notification message indicating reception of a multimedia message, the terminal transmitting a response to the first notification message, the MMS server transmitting a second notification message if the response is not received within a retry period, the terminal replacing the first notification message with the second notification message if the second notification message is received after the terminal downloads the multimedia message and the terminal transmitting a response to the second notification message.

It is contemplated that the method further includes replacing a reception time of the first notification message with a reception time of the second notification message. It is further contemplated that the response to the first notification message includes a message requesting a multimedia message if the terminal is in an auto mode.

It is contemplated that the response to the first notification message includes a reception acknowledgement message corresponding to the first notification message if the terminal is in a deferred mode. It is further contemplated that the method further includes the terminal storing the first notification message for a period of time according to a maximum period of time for a message to arrive. Preferably, the method further includes deleting the second notification message if the second notification message is received after the terminal downloads the multimedia message.

In another aspect of the present invention, a terminal is provided. The terminal includes a receiver adapted to receive a notification message indicating arrival of a multimedia message, a database management module adapted to manage the deletion and storage of the received notification message according to whether the received notification message is a duplicate notification message and whether the multimedia message has been downloaded, a database adapted to store the received notification message according to an instruction from the database management module, a memory including a message processing module adapted to provide a response to the received notification message and a processor adapted to process the received notification message in cooperation with the receiver and the memory according to the instructions in the database management module.

It is contemplated that the database management module includes instructions for and the processor is adapted to delete the received notification message if the received notification message is a duplicate notification message and the multimedia message has been downloaded and replace a presently stored notification message with the received notification message when no multimedia message has been downloaded. It is further contemplated that the database management module includes instructions for and the processor is adapted to store the received notification message in the database management module if the received notification message is not a duplicate notification message.

It is contemplated that the database management module contains instructions for and the processor is adapted to determine that the received notification message is a duplicate notification message if a notification message having a same transaction identifier as the received notification message is stored in the database. It is further contemplated that the message processing module contains instructions for executing and the processor is adapted to provide a response to the received notification message irrespective of whether the received notification message is a duplicate notification message.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 1 illustrates a conventional MMS protocol stack.
FIG. 2 illustrates a conventional MMS transaction flow.

DETAILED DESCRIPTION OF THE PREFERRED EMBODIMENTS

Figure 3A:
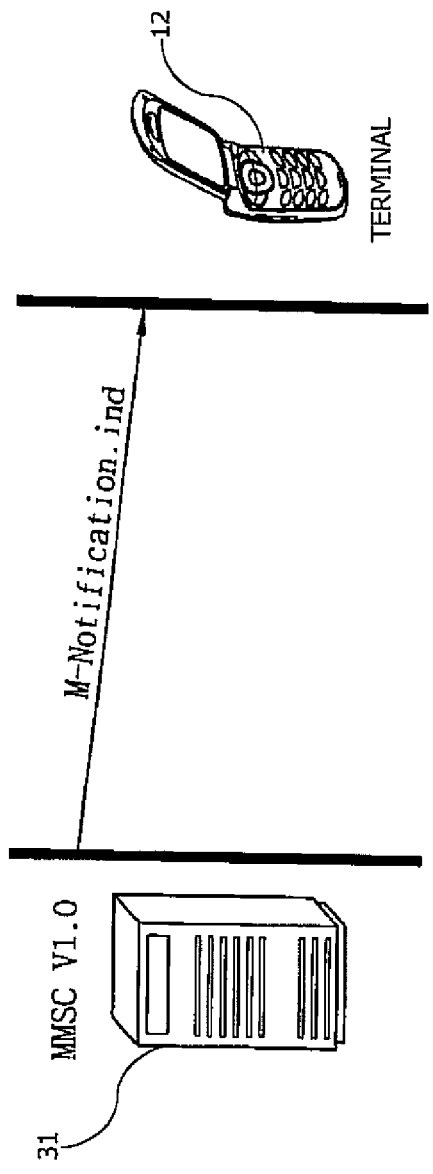
FIG. 3 illustrates service provision methods of an MMS server of version MMSC V1.0 and an MMS server of version MMSC V1.X.
Figure 3B:
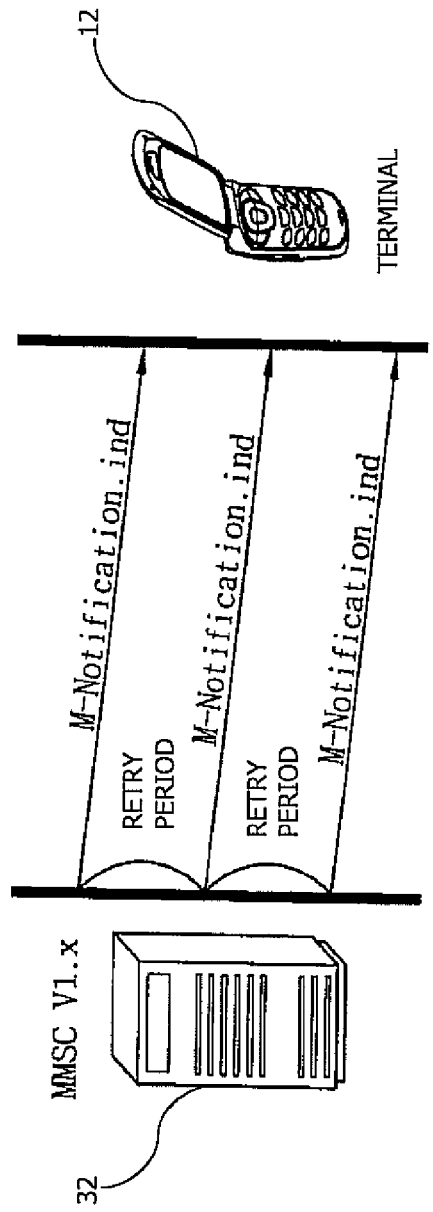
Figure 4:
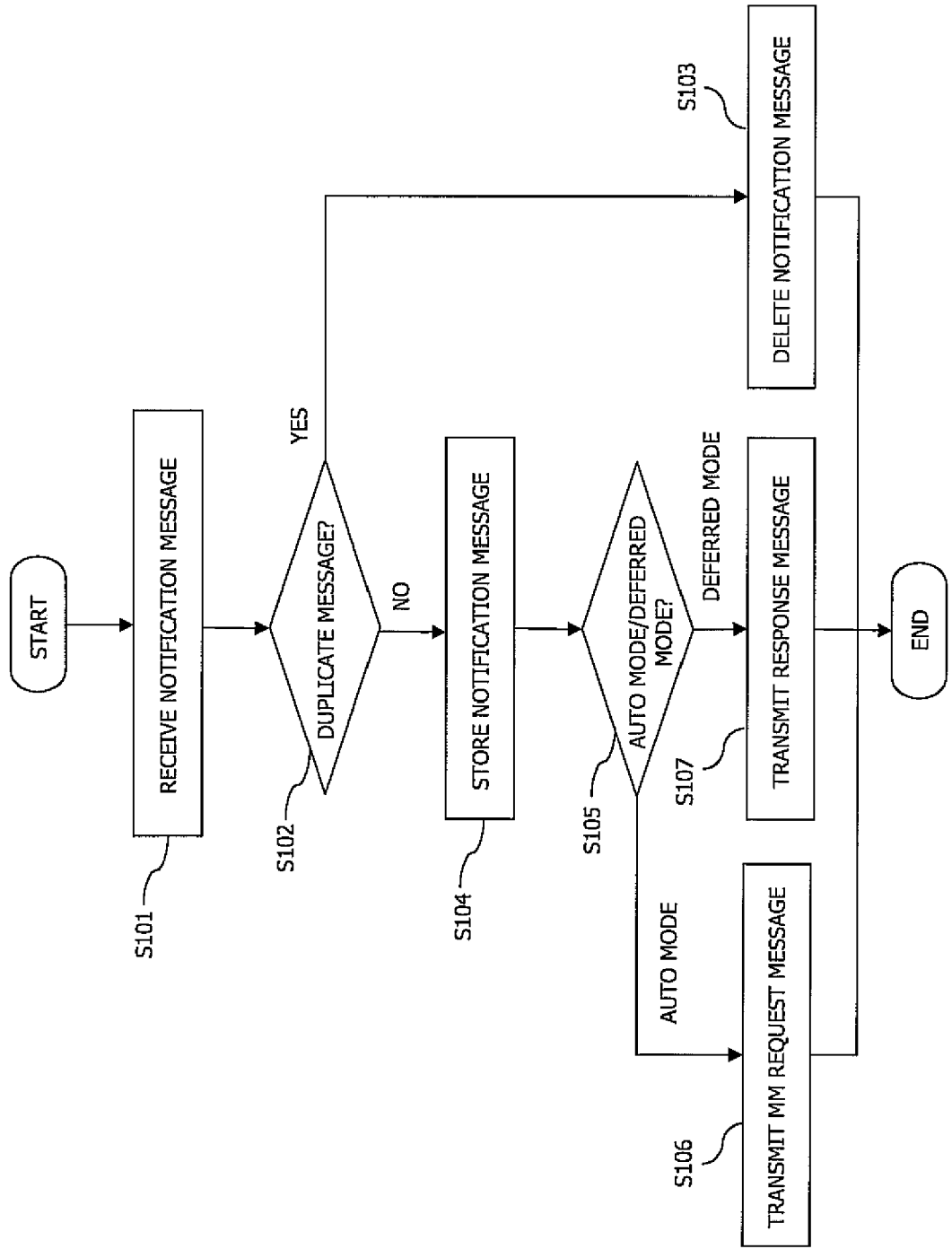
FIG. 4 illustrates a message processing method in a terminal communicating with an MMS server that utilizes a retry mechanism.

The present invention addresses the problem that a message processing procedure in an MMS terminal is not suitable for communication with an MMS server following a retry mechanism. FIG. 4 illustrates a message processing method in an MMS terminal.

A receiving side terminal receives a notification message from an MMS server (S101). The notification message indicates that a multimedia message sent by a transmission side terminal has arrived in the MMS server.

The receiving side terminal receives the notification message and determines whether it is a duplicate notification message (S102). Since the receiving side terminal stores the notification message in a database until it downloads the multimedia message, it is able to identify duplication by determining if the received notification message is a duplicate of a notification message stored in the database.

If the notification message is not a duplicate, it is stored in the database (S104). Subsequently, it is determined whether the operation mode of the terminal is an auto retrieving mode or a deferred retrieving mode (S105). If the received notification message is a duplicate message, it is deleted (S103).

If the receiving side terminal is in the auto mode, a GetReq message is transmitted to the MMS server to request a multimedia message (S106). If the receiving side terminal is in the deferred mode, a response message M-NotifyResp.ind is transmitted to the MMS server in order to indicate reception of the notification message (S107).

There are two problems in the message processing procedure. The first problem is in step S103. The second problem exists is in step S102.

With regard to step 103, the MMS server transmits a second notification message even if a response message transmitted to the MMS server by the receiving side terminal after receiving a first notification message is lost. The receiving side terminal has to transmit a response message for the second notification message or a multimedia request message to the MMS server. However, because the terminal ignores any duplicate notification message unconditionally (S103), it receives consecutive duplicate notification messages.

With regard to step 102, if a duplicate notification message is received after a multimedia message is downloaded, an error occurs when the notification message is not determined as a duplicate message. The error occurs because the terminal deletes a stored notification message after downloading the multimedia message.

Figure 5:
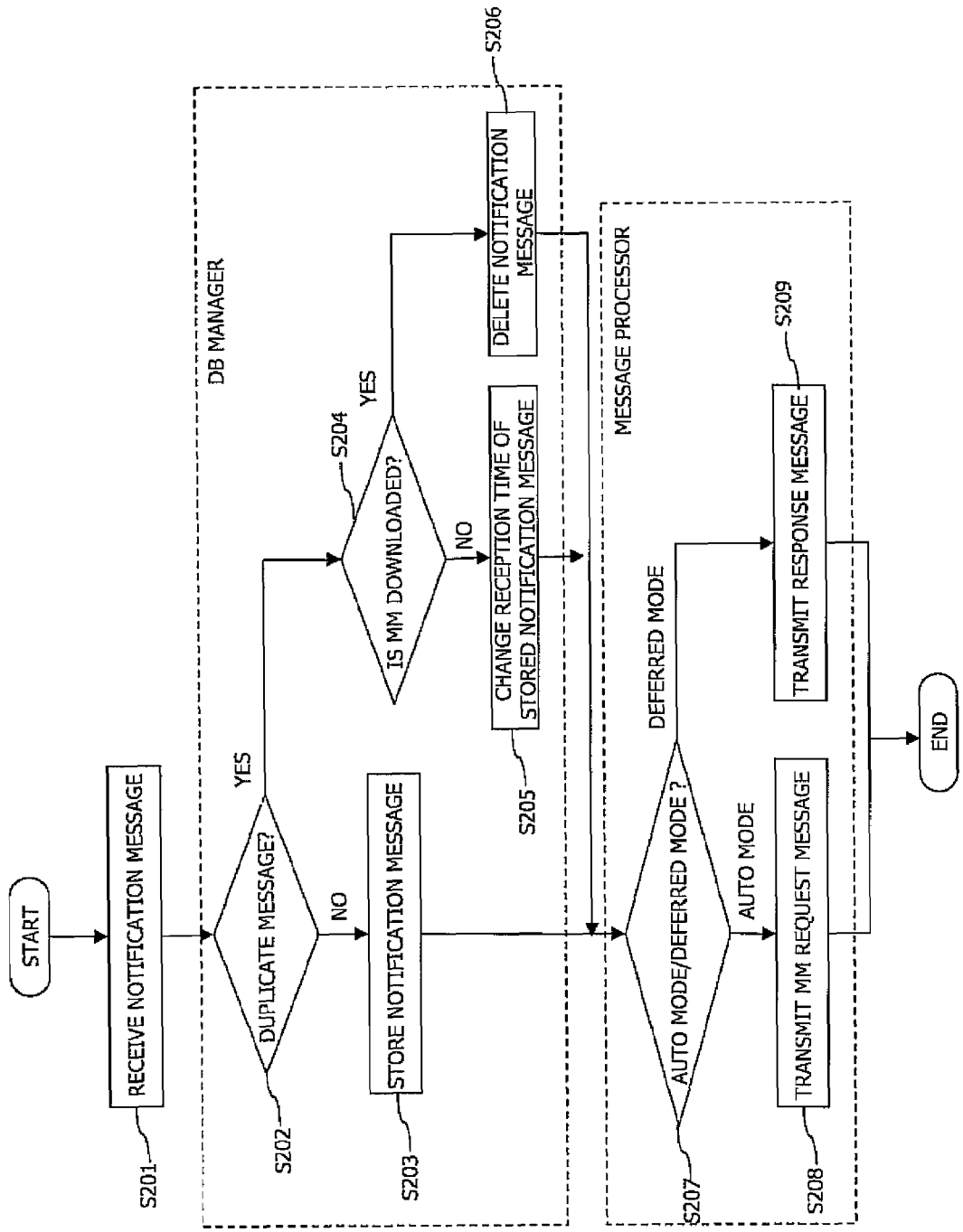
FIG. 5 illustrates a notification message processing method in a terminal according to the present invention.

The present invention provides an improved notification message processing method in a terminal that receives a multimedia message service from an MMS server utilizing a retry mechanism. FIG. 5 illustrates a notification message processing method in a terminal according to the present invention.

First, a terminal supporting a multimedia messaging service receives a notification message transmitted from an MMS server (S201). This notification message indicates that a multimedia message transmitted by a transmission side terminal has arrived in the MMS server.

The terminal determines whether the notification message is a duplicate (S202) after receiving the notification message. All notification messages have a transaction identifier (TID) and the MMS server transmits notification messages with the same TID for the same multimedia message. Accordingly, if the TID of a received notification message is the same as the TID of a previously received notification message, the terminal determines that the received notification message is a duplicate message.

If the notification message is a notification message for a new multimedia message, it is stored (S203). The notification message is stored in a message database for 24 hours.

According to an existing message processing method, the terminal stores the notification message in the database until a multimedia message corresponding to the notification message is downloaded and thereafter deletes it. Thereafter, if a notification message is received after a multimedia message is downloaded due to a failure in the network environment it is impossible to determine whether the newly received notification message is a duplicate message because the previous received notification message is deleted.

To address this problem, the notification message is stored for 24 hours. The storage time is set to 24 hours based on experience that no notification message is received after one full day no matter how poor the network environment.

In one embodiment, the terminal checks during an idle mode if any notification message stored in the message database was received more than 24 hours ago. The terminal deletes any such notification message.

If a duplicate notification message was received, it is determined whether a multimedia message (MM) has been downloaded (S204). If a multimedia message has been downloaded, the duplicate received notification message is deleted immediately because it is a junk message (S206). However, only the reception time of the notification message stored in the message database is changed (S205) if no multimedia message has been downloaded.

Only the reception time of the stored notification message is changed and indicated to the user so that the user can recognize a recently received multimedia message since the user might not download and check a multimedia message that is already stored in the message database. In this way, it is possible to prevent the same duplicate multimedia message from being stored in the message database.

A terminal database manager performs steps S202 to S206. The database manager performs the steps of 1) identifying if a received notification message is a duplicate message via a comparison with notification messages stored in the database, 2) storing only a non-duplicate notification message in the database, 3) identifying if a multimedia message has been downloaded upon receipt of a duplicate notification message; 4) deleting any duplicate notification message received after a multimedia message has been downloaded, and 5) changing only the reception time of the stored notification message if a duplicate notification message is received before a multimedia message is downloaded.

The database manager processes a notification message differently depending upon whether the received notification message is a duplicate message. Aside from this, the terminal transmits M-NotiResp.ind or GetReq to the MMS server for all received notification messages.

Steps S207 to S209 transmit M-NotiResp.ind or GetReq to the MMS server and are performed in a terminal message processor. The terminal message processor determines whether the terminal is in an auto retrieving mode or in a deferred retrieving mode (S207).

In the auto mode, the terminal transmits a multimedia request message GetReq to the MMS server (S208). In the deferred mode, the terminal transmits a response message M-NotiResp.ind to the MMS server (S209).

Because terminal unconditionally sends GetReq or M-NotiResp.ind to the MMS server upon receipt of a notification message, the MMS server may not consecutively send the same notification message without checking if the terminal has received a notification message. The MMS server may receive GetReq or M-NotiResp.ind for the same multimedia message, which does not cause a problem since the MMS server deletes GetReq or NotiResp.ind having the same TID upon receipt.

Figure 6:
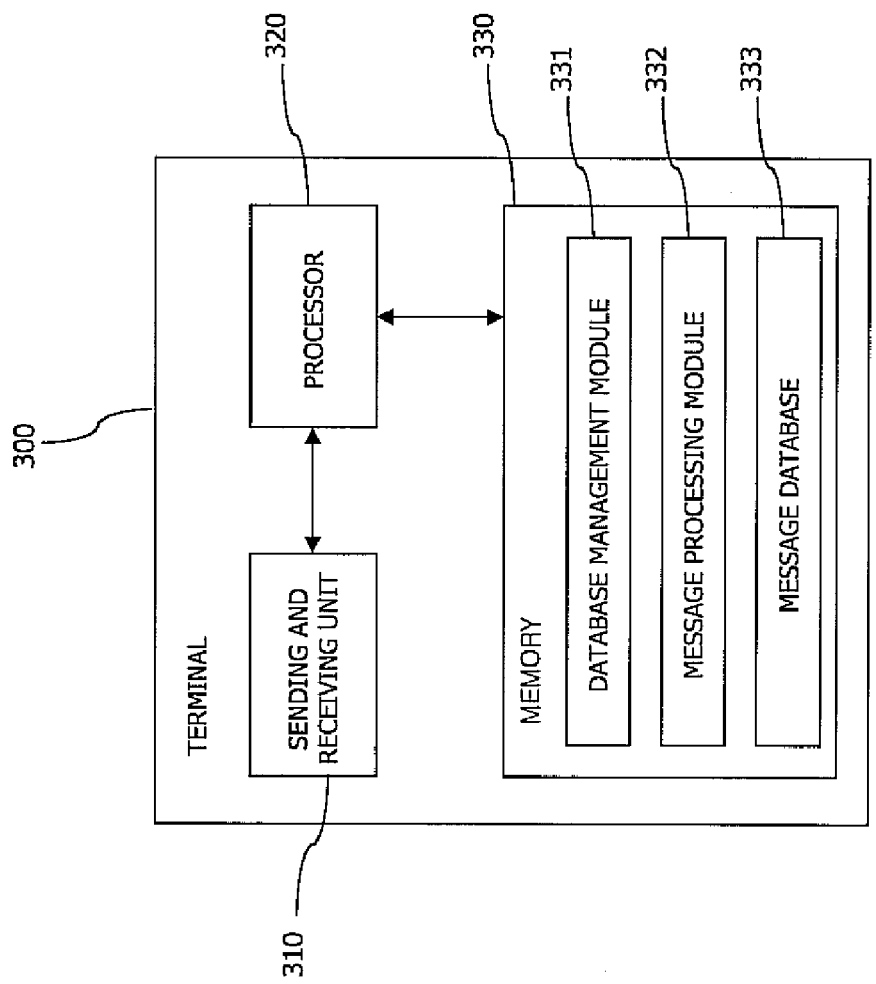
FIG. 6 is a block diagram of a terminal according to the present invention.

FIG. 6 illustrates a block diagram of a terminal 300 according to the present invention. The terminal 300 includes a sending and receiving unit 310 for communicating with an MMS server, a memory 330 and a processor 320 for interfacing with the memory 330 and the sending and receiving unit 310.

The memory 330 includes a database management module 331 for managing the storage and deletion of a received message, a message processing module 332 for controlling message transmission and a message database 333 for storing a message. The database management module 331 and the message processing module 332 contain instructions executable by the processor 320.

The sending and receiving unit 310 can receive a notification message M-Notification.ind or a multimedia message M-retrieve.conf by communicating with a server supporting a multimedia messaging service. The sending and receiving unit 310 can also send a message M-NotifyResp.ind in response to the notification message and a message GetReq requesting a multimedia message.

The database management module 331 contains instructions for executing the steps of determining whether a received notification message is a duplicate message, storing the received notification message in the message database 333 if the received notification message is not a duplicate message, determining whether a multimedia message has been downloaded if the received notification message is a duplicate message, deleting the notification message if a multimedia message is downloaded and changing the reception time of the notification message if no multimedia message has been downloaded.

The database management module 331 determines whether a message having the same TID as a received notification message is stored in the message database 333 in order to determine whether the received notification message is a duplicate message. If any stored message has the same TID as the received message, the received message is determined to be a duplicate.

Additionally, the database management module 331 retrieves the message database 333 in the idle mode or when power is turned on and deletes messages received more than 24 hours ago. The message storage period, which is a variable time period, is set to 24 hours according to experience that a message arrives within 24 hours no matter how poor the network environment.

The message processing module 332 contains instructions for executing the steps of determining whether the terminal is in an auto mode or in a deferred mode, transmitting an MM request message GetReq if the terminal is in the auto mode, and transmitting a response message M-NotifyResp.in if the terminal is in the deferred mode. The message processing module 332 responds to the MMS server for all notification messages because it does not determine whether a received notification message is a duplicate message.

Figure 7:
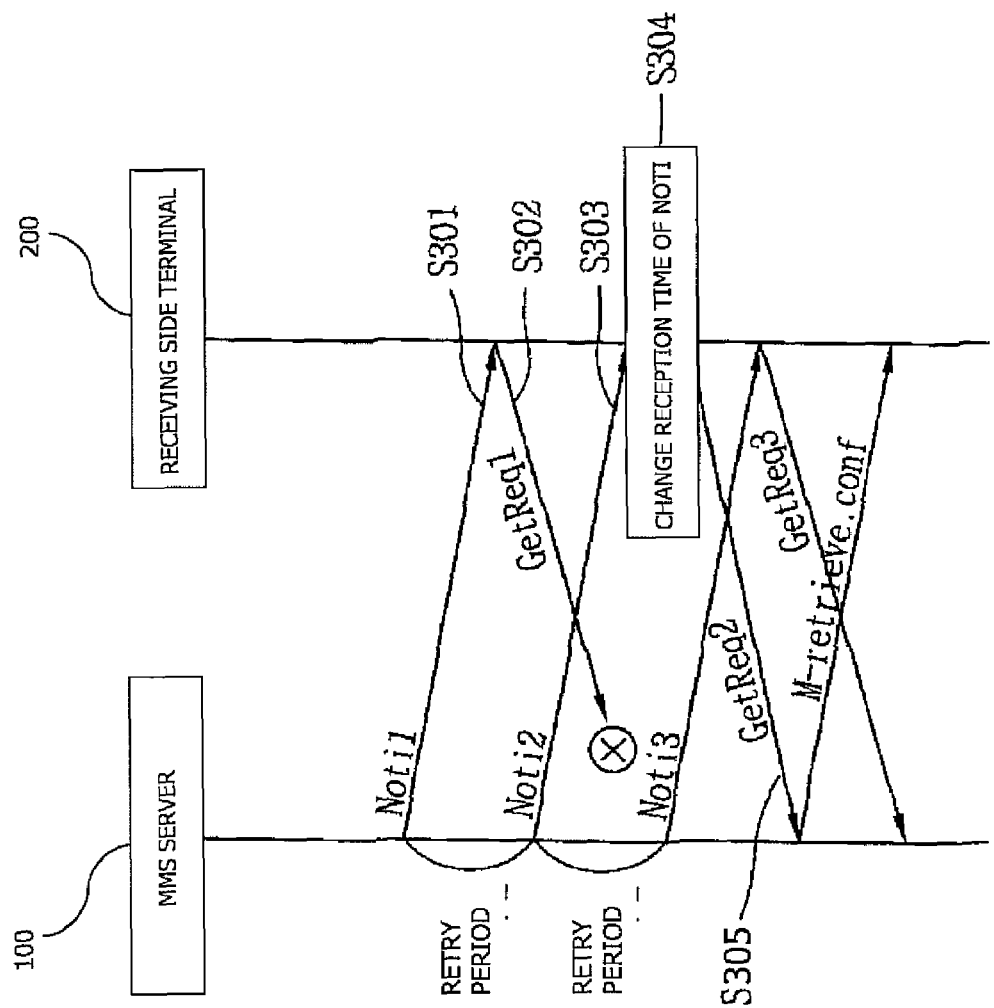
FIG. 7 illustrates a first scenario in which a duplicate notification message is received by a message processing method according to the present invention.
Figure 8:
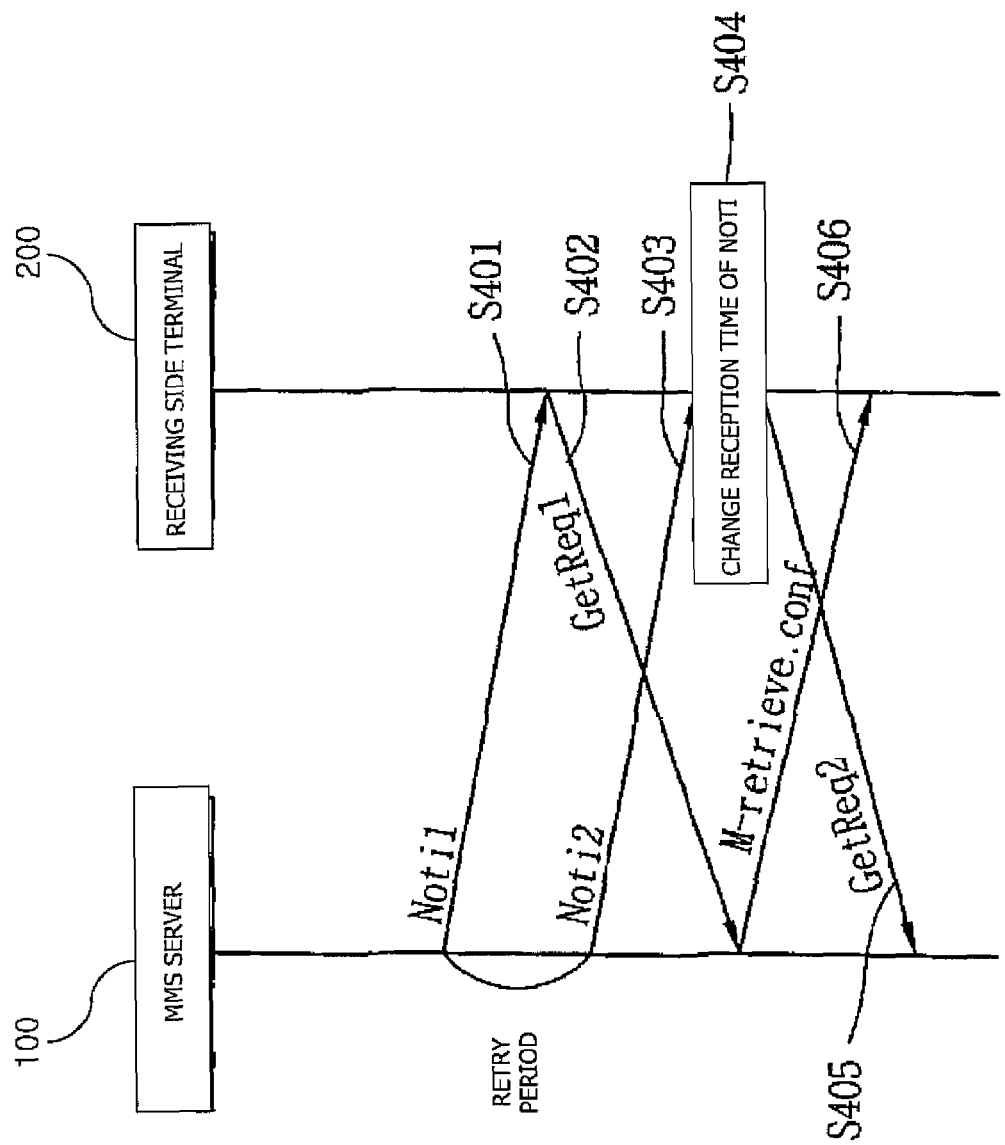
FIG. 8 illustrates a second scenario in which a duplicate notification message is received by a message processing method according to the present invention.

A message processing method when a terminal receives a duplicate notification message in an auto mode will be described with reference to FIGS. 7 to 9. FIG. 7 illustrates a first scenario in which a duplicate notification message is received by a message processing method according to the present invention. FIG. 8 shows a second scenario in which a duplicate notification message is received by a message processing method according to the present invention.

As illustrated in FIG. 7, an MMS server 100 transmits Noti (M-Notification.ind)1 to a receiving side terminal 200 (S301) after receiving a multimedia message from a transmission side terminal (not shown). Subsequently, the receiving side terminal 200 transmits a multimedia request message GetReq1 to the MMS server 100 (S302).

If the GetReq1 is lost and does not arrive in the MMS server 100, the MMS server re-transmits a notification message Noti2 to the receiving side terminal 200 (S303) after a retry period has elapsed. The receiving side terminal 200 changes the reception time of the notification message (S304) and transmits GetReq2 to the MMS server 100 (S305) after receiving Noti2.

Since the receiving side terminal 200 has transmitted an MM request message GetReq1 to the MMS server 100, but the MMS server 100 has not received it, the receiving side terminal 200 consecutively receives a duplicate notification message unless it transmits GetReq1 to the MMS server due to the duplication of the notification message. Accordingly, the receiving side terminal 200 transmits GetReq2 for the duplicate notification message.

As illustrated in FIG. 8, when a receiving side terminal 200 receives a notification message Noti1 from a MMS server 100 (S401), the receiving side terminal transmits an MM request message GetReq1 to the MMS server (S402). However, the MMS server 100 transmits Noti2 when it has received no GetReq1 during a retry period after the transmission of Noti1 (S403).

Accordingly, the receiving side terminal 200 receives a duplicate notification message Noti2 and only the reception time of the notification message is changed (S404) since the receiving side terminal has not yet received a multimedia message M-retrieve.conf. Subsequently, the receiving side terminal 200 re-transmits a multimedia request message to the MMS server 100 (S405).

However, the retransmission causes no problem because the MMS sever 100 ignores a duplicate multimedia request message according to the TID comparison. Therefore, the receiving side terminal 200 receives only a multimedia message M-retrieve.conf in response to GetReq1 (S406).

In the second scenario illustrated in FIG. 8, the receiving side terminal 200 does not have to transmit an MM request message GetReq1 to the MMS server 100 after receiving a duplicate notification message. However, since the receiving side terminal 200 cannot know that the MMS server 100 transmits a duplicate notification message because GetReq1 is lost or because GetReq1 has arrived later than expected (after a retry period), the receiving side terminal 200 unconditionally transmits a multimedia request message to the MMS server upon receipt of Noti2. In other words, the receiving side terminal 200 handles the first scenario illustrated in FIG. 7 in the same manner as it handles the second scenario illustrated in FIG. 8.

Figure 9:
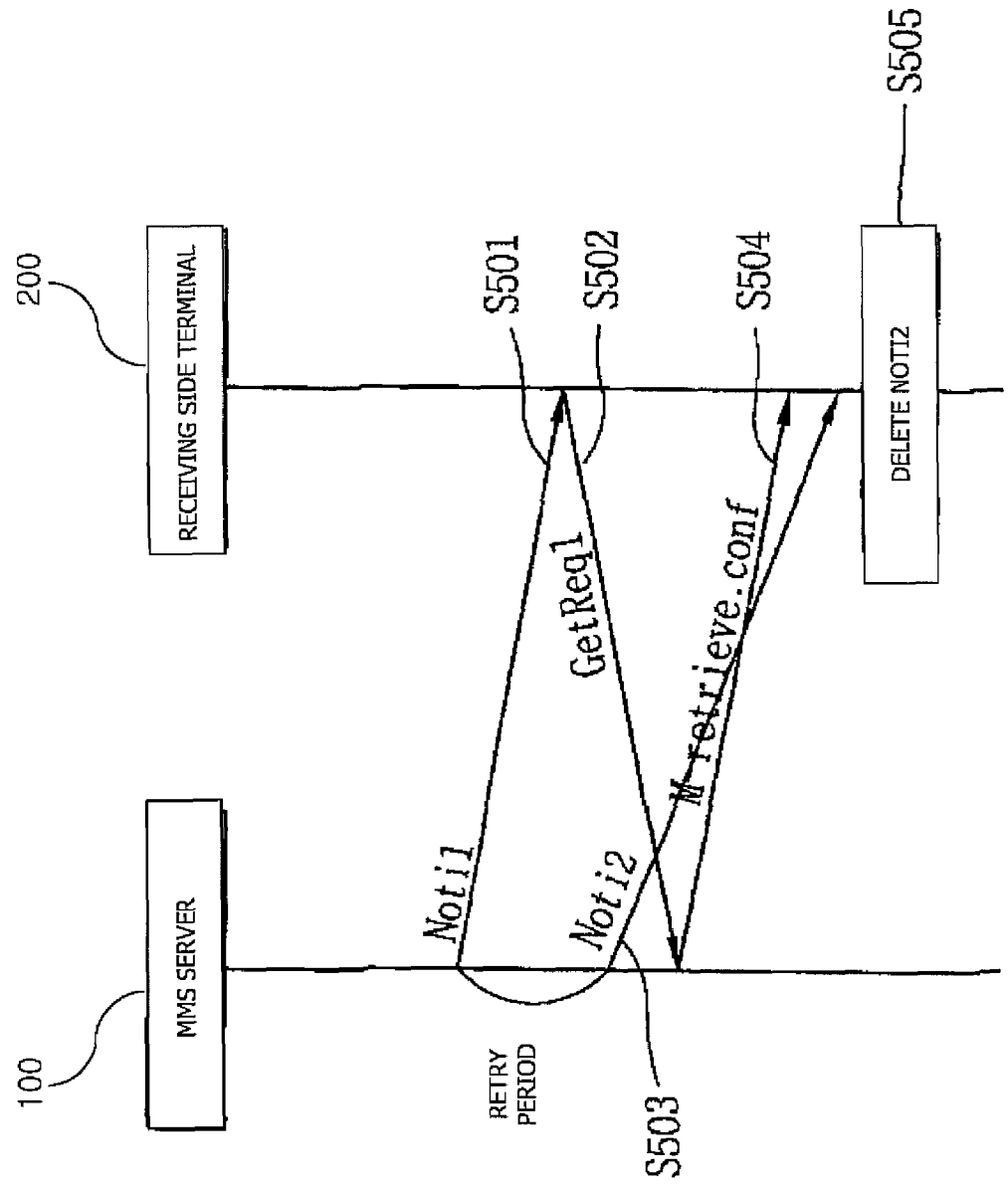
FIG. 9 illustrates a third scenario in which a duplicate notification message is received by a message processing method according to the present invention.

FIG. 9 illustrates a third scenario in which a duplicate notification message is received by a message processing method according to the present invention. When a receiving side terminal 200 receives a notification message Noti1 (S501), it transmits an MM message GetReq1 to MMS server 100 (S502).

Meanwhile, the MMS server 100 re-transmits a notification message Noti2 to the receiving side terminal 200 (S503) after receiving no GetReq1 during a retry period. Subsequently, the MMS server 100 transmits a multimedia message M-retrieve.conf to the receiving side terminal 200 (S504) upon receiving GetReq1.

When, the receiving side terminal 200 receives a duplicate notification message Noti2 after receiving a multimedia message M-retrieve.conf, the duplicate notification message Noti2 is deleted immediately without being stored (S505). It can be seen that Noti2 is a duplicate message because Noti1 is not deleted even after a multimedia message has been downloaded.

If the receiving side terminal 200 receives a duplicate notification message after downloading a multimedia message, GetReq may be transmitted although it is not necessary. This is because the MMS server 100 deletes a duplicate MM request message immediately upon receiving it and does not transmit the same multimedia message.

The terminal according to the present invention is advantageous in that a response is transmitted for a duplicate notification message as well as for a new notification message so that no unnecessary duplicate message is repeatedly received. Furthermore, the terminal does not receive unnecessary duplicate notification messages, thereby preventing additional battery consumption caused by repetition of receiving and deleting unnecessary messages. Moreover, the terminal stores a notification message for a predetermined period of time without deletion after downloading a multimedia message.

If the terminal receives the same notification message as a notification message previously stored after downloading a multimedia message, the received notification message is identified as a duplicate notification message. Accordingly, it is possible to solve the problem of duplicate billing for the same multimedia message caused by recognizing a received duplicate notification message as a new notification message after downloading a multimedia message.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of processing a duplicate notification message in a terminal supporting a multimedia messaging service (MMS), the method comprising:
   receiving a notification message indicating reception of a multimedia message from an MMS server;
   determining if the notification message is a duplicate notification message;
   deleting the notification message if it is determined that a multimedia message corresponding to the notification message has been downloaded and it is determined that the notification message is a duplicate notification message received after the multimedia message corresponding to the notification message has been downloaded; and
   transmitting either a response message corresponding to the notification message or a request message requesting a multimedia message if it is determined that the notification message is not a duplicate notification message.

2. The method of claim 1, further comprising transmitting either a response message corresponding to the notification message or a message requesting a multimedia message if it is determined that the notification message is a duplicate notification message.

3. The method of claim 1, further comprising changing a reception time of the notification message if it is determined that the notification message is a duplicate notification message and no multimedia message corresponding to the duplicate notification message has been downloaded.

4. The method of claim 1, further comprising storing the notification message if it is determined that the notification message is not a duplicate notification message.

5. The method of claim 4, further comprising:
   setting a maximum time for a message to arrive as a maximum storage time; and
   deleting at least one stored notification message that has been stored for greater than the maximum storage time.

6. The method of claim 5, wherein deleting the at least one stored notification message is performed during an idle mode.

7. The method of claim 5, wherein deleting the at least one stored notification message is performed when initializing the terminal.

8. The method of claim 1, further comprising:
   setting a maximum time for a message to arrive as a maximum storage time; and
   storing the notification message for a period of time according to the maximum storage time if it is determined that the notification message is not a duplicate notification message.

9. The method of claim 1, wherein determining if the notification message is a duplicate notification message comprises determining if a transaction identifier (TID) of the notification message is the same as a transaction identifier of a stored notification message.

10. A method of processing a duplicate notification message in a multimedia messaging service (MMS), the method comprising:
    an MMS server transmitting a first notification message to a terminal, the first notification message indicating reception of a multimedia message;
    the terminal transmitting a response to the first notification message;
    the MMS server transmitting a second notification message if the response is not received within a retry period;
    the terminal replacing at least a part of the first notification message with at least a part of the second notification message if the second notification message is received before the terminal downloads the multimedia message;
    the terminal transmitting a response to the second notification message; and
    deleting the second notification message if the second notification message is received after the terminal downloads the multimedia message.

11. The method of claim 10, further comprising replacing a reception time of the first notification message with a reception time of the second notification message.

12. The method of claim 10, wherein the response to the first notification message comprises a message requesting a multimedia message if the terminal is in an auto mode.

13. The method of claim 10, wherein the response to the first notification message comprises a reception acknowledgement message corresponding to the first notification message if the terminal is in a deferred mode.

14. The method of claim 10, further comprising the terminal storing the first notification message for a period of time according to a maximum period of time for a message to arrive.

15. A terminal for processing a duplicate notification message, comprising:
    a receiver configured to receive a notification message indicating arrival of a multimedia message;
    a database management module configured to manage the deletion and storage of the received notification message according to whether the received notification message is a duplicate notification message and whether the multimedia message has been downloaded, wherein the database management module is configured to delete the received notification message if the multimedia message has been downloaded and the received notification message is a duplicate notification message received after the multimedia message has been downloaded;
    a database configured to store the received notification message according to an instruction from the database management module;
    a memory comprising a message processing module configured to provide a response to the received notification message; and
    a processor configured to process the received notification message in cooperation with the receiver and the memory according to the instructions in the database management module.

16. The terminal of claim 15, wherein the database management module comprises instructions for deleting the received notification message and replacing a stored notification message with the received notification message; and the processor is configured to:
    delete the received notification message if the received notification message is a duplicate notification message and the multimedia message has been downloaded; and
    replace a presently stored notification message with the received notification message when no multimedia message has been downloaded.

17. The method of claim 15, wherein the database management module comprises instructions for storing the received notification message in the database management module and the processor is configured to store the received notification message in the database management module if the received notification message is not a duplicate notification message.

18. The method of claim 15, wherein the processor is configured to determine that the received notification message is a duplicate notification message if a notification message having a same transaction identifier as the received notification message is stored in the database.

19. The method of claim 15, wherein the processor is configured to provide a response to the received notification message irrespective of whether the received notification message is a duplicate notification message.

20. A method of processing a duplicate notification message in a terminal supporting a multimedia messaging service (MMS), the method comprising:

receiving a notification message indicating reception of a multimedia message from an MMS server;

determining if the notification message is a duplicate notification message by comparing information of the notification message with information of at least one previously received notification message;

deleting the notification message if it is determined that a multimedia message corresponding to the notification message has been downloaded and it is determined that the notification message is a duplicate notification message; and transmitting either a response message corresponding to the notification message or a request message requesting a multimedia message if it is determined that the notification message is not a duplicate notification message.

* * * * *